United States Patent
Call et al.

(10) Patent No.: US 8,793,429 B1
(45) Date of Patent: Jul. 29, 2014

(54) SOLID-STATE DRIVE WITH REDUCED POWER UP TIME

(75) Inventors: Matthew Call, Longmont, CO (US); Lyndon S. Chiu, Irvine, CA (US); Robert L. Horn, Yorba Linda, CA (US); Lan D. Phan, Garden Grove, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 99 days.

(21) Appl. No.: 13/152,645

(22) Filed: Jun. 3, 2011

(51) Int. Cl.
 *G06F 12/00* (2006.01)
 *G06F 13/00* (2006.01)
 *G06F 13/28* (2006.01)

(52) U.S. Cl.
 USPC ........... 711/103; 711/154; 711/170; 711/162; 711/202; 711/E12.001; 711/E12.002; 711/E12.008

(58) Field of Classification Search
 USPC .................................. 711/202, 103
 See application file for complete search history.

(56) References Cited

U.S. PATENT DOCUMENTS

| | | | | |
|---|---|---|---|---|
| 3,614,746 A | * | 10/1971 | Klinkhamer | 711/206 |
| 3,878,513 A | * | 4/1975 | Werner | 711/154 |
| 3,916,385 A | * | 10/1975 | Parmar et al. | 711/109 |
| 4,136,385 A | * | 1/1979 | Gannon et al. | 711/207 |
| 4,177,510 A | * | 12/1979 | Appell et al. | 711/163 |
| 4,385,352 A | * | 5/1983 | Bienvenu | 711/208 |
| 4,527,232 A | * | 7/1985 | Bechtolsheim | 711/206 |
| 4,754,394 A | * | 6/1988 | Brantley et al. | 711/5 |
| 4,758,951 A | * | 7/1988 | Sznyter, III | 711/206 |
| 4,769,770 A | | 9/1988 | Miyadera et al. | |
| 5,613,066 A | | 3/1997 | Matsushima et al. | |
| 6,092,231 A | | 7/2000 | Sze | |
| 6,202,121 B1 | | 3/2001 | Walsh et al. | |
| 6,324,604 B1 | | 11/2001 | Don et al. | |
| 6,339,811 B1 | | 1/2002 | Gaertner et al. | |
| 6,574,774 B1 | | 6/2003 | Vasiliev | |
| 6,715,027 B2 | * | 3/2004 | Kim et al. | 711/103 |
| 6,772,274 B1 | | 8/2004 | Estakhri | |
| 6,829,688 B2 | | 12/2004 | Grubbs et al. | |
| 6,886,068 B2 | | 4/2005 | Tomita | |
| 6,895,468 B2 | | 5/2005 | Rege et al. | |
| 6,901,479 B2 | | 5/2005 | Tomita | |

(Continued)

FOREIGN PATENT DOCUMENTS

| | | | |
|---|---|---|---|
| JP | 2006209608 A | * | 8/2006 |
| WO | 2009/102425 A1 | | 8/2009 |

OTHER PUBLICATIONS

Roberts et al, "Integrating NAND Flash Devices onto Servers", Communications of the ACM, vol. 52, No. 4, pp. 98-106 (9 pages), Apr. 2009.*

(Continued)

*Primary Examiner* — Sanjiv Shah
*Assistant Examiner* — Daniel C Chappell (57) ABSTRACT

A non-volatile storage system is provided with reduced delays associated with loading and updating a logical-to-physical mapping table from non-volatile memory. The mapping table is stored in a plurality of segments, so that each segment can be loaded individually. The segmented mapping table allows memory access to logical addresses associated with the loaded segment when the segment is loaded, rather than delaying accesses until the entire mapping table is loaded. When loading mapping segments, segments can be loaded according to whether there is a pending command or by an order according to various algorithms.

20 Claims, 5 Drawing Sheets

(56) References Cited

U.S. PATENT DOCUMENTS

| | | |
|---|---|---|
| 6,920,455 B1 | 7/2005 | Weschler |
| 6,967,810 B2 | 11/2005 | Kasiraj et al. |
| 7,155,448 B2 | 12/2006 | Winter |
| 7,412,585 B2 | 8/2008 | Uemura |
| 7,486,460 B2 | 2/2009 | Tsuchinaga et al. |
| 7,490,212 B2 | 2/2009 | Kasiraj et al. |
| 7,509,471 B2 | 3/2009 | Gorobets |
| 7,516,267 B2 | 4/2009 | Coulson et al. |
| 7,529,880 B2 | 5/2009 | Chung et al. |
| 7,539,924 B1 | 5/2009 | Vasquez et al. |
| 7,603,530 B1 | 10/2009 | Liikanen et al. |
| 7,647,544 B1 | 1/2010 | Masiewicz |
| 7,669,044 B2 | 2/2010 | Fitzgerald et al. |
| 7,685,360 B1 | 3/2010 | Brunnett et al. |
| 7,840,878 B1 | 11/2010 | Tang et al. |
| 8,006,027 B1 | 8/2011 | Stevens et al. |
| 8,150,805 B1* | 4/2012 | Tawri et al. .............. 707/629 |
| 8,443,167 B1* | 5/2013 | Fallone et al. ............. 711/206 |
| 8,504,795 B2* | 8/2013 | Shah et al. ................ 711/206 |
| 2002/0108014 A1* | 8/2002 | Lasser ........................ 711/103 |
| 2002/0116569 A1* | 8/2002 | Kim et al. ................... 711/103 |
| 2004/0019718 A1 | 1/2004 | Schauer et al. |
| 2004/0109376 A1 | 6/2004 | Lin |
| 2005/0071537 A1 | 3/2005 | New et al. |
| 2005/0144517 A1 | 6/2005 | Zayas |
| 2006/0090030 A1 | 4/2006 | Ijdens et al. |
| 2006/0090031 A1* | 4/2006 | Kirshenbaum et al. ..... 711/113 |
| 2006/0112138 A1 | 5/2006 | Fenske et al. |
| 2006/0117161 A1 | 6/2006 | Venturi |
| 2006/0181993 A1 | 8/2006 | Blacquiere et al. |
| 2006/0253645 A1* | 11/2006 | Lasser ........................ 711/103 |
| 2006/0271727 A1* | 11/2006 | Wang et al. ................. 711/103 |
| 2007/0016721 A1 | 1/2007 | Gay |
| 2007/0067603 A1 | 3/2007 | Yamamoto et al. |
| 2007/0204100 A1 | 8/2007 | Shin et al. |
| 2007/0226394 A1 | 9/2007 | Noble |
| 2007/0245064 A1 | 10/2007 | Liu |
| 2007/0288686 A1 | 12/2007 | Arcedera et al. |
| 2007/0294589 A1 | 12/2007 | Jarvis et al. |
| 2008/0098195 A1 | 4/2008 | Cheon et al. |
| 2008/0104308 A1 | 5/2008 | Mo et al. |
| 2008/0172519 A1* | 7/2008 | Shmulevich et al. ........ 711/103 |
| 2008/0177935 A1* | 7/2008 | Lasser et al. ................ 711/103 |
| 2008/0183955 A1 | 7/2008 | Yang et al. |
| 2008/0195801 A1 | 8/2008 | Cheon et al. |
| 2008/0256287 A1 | 10/2008 | Lee et al. |
| 2008/0256295 A1 | 10/2008 | Lambert et al. |
| 2008/0270680 A1 | 10/2008 | Chang |
| 2008/0307192 A1 | 12/2008 | Sinclair et al. |
| 2009/0019218 A1 | 1/2009 | Sinclair et al. |
| 2009/0043985 A1 | 2/2009 | Tuuk et al. |
| 2009/0055618 A1* | 2/2009 | Nakanishi et al. ........... 711/173 |
| 2009/0055620 A1 | 2/2009 | Feldman et al. |
| 2009/0063548 A1 | 3/2009 | Rusher et al. |
| 2009/0119353 A1 | 5/2009 | Oh et al. |
| 2009/0150599 A1 | 6/2009 | Bennett |
| 2009/0154254 A1 | 6/2009 | Wong et al. |
| 2009/0164535 A1 | 6/2009 | Gandhi et al. |
| 2009/0164696 A1 | 6/2009 | Allen et al. |
| 2009/0187732 A1 | 7/2009 | Greiner et al. |
| 2009/0193184 A1 | 7/2009 | Yu et al. |
| 2009/0198952 A1 | 8/2009 | Khmelnitsky et al. |
| 2009/0204750 A1 | 8/2009 | Estakhri et al. |
| 2009/0222643 A1 | 9/2009 | Chu |
| 2009/0240873 A1 | 9/2009 | Yu et al. |
| 2009/0276604 A1 | 11/2009 | Baird et al. |
| 2010/0011275 A1 | 1/2010 | Yang |
| 2010/0061150 A1 | 3/2010 | Wu et al. |
| 2010/0161881 A1 | 6/2010 | Nagadomi et al. |
| 2010/0169543 A1 | 7/2010 | Edgington et al. |
| 2010/0169551 A1 | 7/2010 | Yano et al. |
| 2010/0208385 A1 | 8/2010 | Toukairin |
| 2010/0262799 A1* | 10/2010 | Lasser et al. ................ 711/162 |
| 2010/0332732 A1* | 12/2010 | Chiang et al. ............... 711/103 |
| 2011/0138145 A1* | 6/2011 | Magruder et al. ........... 711/167 |
| 2011/0276756 A1* | 11/2011 | Bish et al. ................... 711/112 |
| 2013/0166844 A1* | 6/2013 | Benhase et al. ............. 711/118 |
| 2013/0282934 A1* | 10/2013 | England et al. ............. 710/22 |

OTHER PUBLICATIONS

Definition of pending, Merriam-Webster Dictionary, retrieved from http://www.merriam-webster.com/dictionary/pending on Nov. 29, 2013 (1 page).*

Rosenblum, Mendel and Ousterhout, John K. (Feb. 1992), "The Design and Implementation of a Log-Structured File System." ACM Transactions on Computer Systems, vol. 10, Issue 1, pp. 26-52.

Rosenblum, "The Design and Implementation of a Log-structured File System", EECS Department, University of California, Berkeley, Technical Report No. UCB/CSD-92-696, Jun. 1992.

Amer, et al., ""Design Issues for a Shingled Write Disk System"", 26th IEEE Symposium on Massive Storage Systems and Technologies: Research Track (MSST2010), May 2010, 12 pages.

* cited by examiner

Fig. 1

| Mapping Table | |
|---|---|
| LCN 0 | PCN 5 |
| LCN 1 | PCN 11 |
| LCN 2 | Not Mapped / Trim |
| LCN 3 | Not Mapped / Trim |
| LCN 4 | Not Mapped / Trim |
| LCN 5 | PCN 1 |
| LCN 6 | Not Mapped / Trim |
| LCN 7 | PCN 7 |
| LCN 8 | Not Mapped / Trim |
| LCN 9 | PCN 2 |
| LCN 10 | Not Mapped / Trim |
| LCN 11 | PCN 6 |
| LCN 12 | Not Mapped / Trim |
| LCN 13 | PCN 8 |
| LCN 14 | PCN 9 |
| LCN 15 | PCN 10 |

200

| Invalid Page Table | |
|---|---|
| PCN 0 | |
| PCN 1 | V |
| PCN 2 | V |
| PCN 3 | |
| PCN 4 | V |
| PCN 5 | V |
| PCN 6 | V |
| PCN 7 | V |
| PCN 8 | V |
| PCN 9 | V |
| PCN 10 | V |
| PCN 11 | |
| PCN 12 | |
| PCN 13 | |
| PCN 14 | |
| PCN 15 | |

210

| | Log Entries | | |
|---|---|---|---|
| | LCN | Old PCN | New PCN |
| Log 0 | LCN 11 | PCN 6 | PCN 15 |
| Log 1 | LCN 7 | PCN 7 | PCN 14 |
| Log 2 | LCN 13 | PCN 8 | PCN 12 |
| Log 3 | LCN 14 | PCN 9 | PCN 0 |
| Log 4 | LCN 15 | PCN 10 | PCN 3 |
| Log 5 | LCN 1 | PCN 11 | PCN 4 |

| | | |
|---|---|---|
| Segment 1 | LCN 0 | PCN 5 |
| | LCN 1 | PCN 11 |
| | LCN 2 | Not Mapped / Trim |
| | LCN 3 | Not Mapped / Trim |
| Segment 2 | LCN 4 | Not Mapped / Trim |
| | LCN 5 | PCN 1 |
| | LCN 6 | Not Mapped / Trim |
| | LCN 7 | PCN 7 |
| Segment 3 | LCN 8 | Not Mapped / Trim |
| | LCN 9 | PCN 2 |
| | LCN 10 | Not Mapped / Trim |
| | LCN 11 | PCN 6 |
| Segment 4 | LCN 12 | Not Mapped / Trim |
| | LCN 13 | PCN 8 |
| | LCN 14 | PCN 9 |
| | LCN 15 | PCN 10 |

Log Segment 1: LCN 1 | PCN 11  — 311

Log Segment 2: LCN 7 | PCN 7  — 312

Log Segment 3: LCN 11 | PCN 6  — 313

Log Segment 4: LCN 13 | PCN 8; LCN 14 | PCN 9; LCN 15 | PCN 10  — 314

Fig. 4

| | Invalid Page Table | | Log Entries | |
| --- | --- | --- | --- | --- |
| | | | Old PCN | New PCN |
| LCN 0 | | Log 0 | PCN 6 | PCN 15 |
| LCN 1 | V | Log 1 | PCN 7 | PCN 14 |
| LCN 2 | V | Log 2 | PCN 8 | PCN 12 |
| LCN 3 | | Log 3 | PCN 9 | PCN 0 |
| LCN 4 | | Log 4 | PCN 10 | PCN 3 |
| LCN 5 | V | Log 5 | PCN 11 | PCN 4 |
| LCN 6 | V | | | |
| LCN 7 | V | | | |
| LCN 8 | V | | | |
| LCN 9 | V | | | |
| LCN 10 | V | | | |
| LCN 11 | V | | | |
| LCN 12 | | | | |
| LCN 13 | | | | |
| LCN 14 | | | | |
| LCN 15 | | | | |

SOLID-STATE DRIVE WITH REDUCED POWER UP TIME

BACKGROUND

1. Technical Field

This disclosure relates to non-volatile storage subsystems, including but not limited to flash drives. More particularly, the disclosure relates to systems for reducing delays for an initial memory access associated with loading mapping data.

2. Description of the Related Art

Solid-state storage systems maintain a logical-to-physical mapping table for memory accesses. This mapping table associates logical addresses used by a host with corresponding physical storage locations in the non-volatile memory. On power up, the mapping table and a log of changes are loaded from non-volatile memory to reload the storage system status. However, loading and updating the mapping table from a log can incur delays for memory accesses.

BRIEF DESCRIPTION OF THE DRAWINGS

Systems and methods which embody the various features of the invention will now be described with reference to the following drawings, in which.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

DEFINITIONS

As used in this application, "non-volatile memory" typically refers to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

As used in this application, a "segment" refers broadly to any partition, division, or portion of a whole. Segments may or may not be of equal size and the size of each segment may vary over time.

System Overview

Embodiments of the invention are directed to systems and methods for reducing delay attributable to loading and updating a mapping table. These delays are reduced by segmenting the mapping table into portions which can be loaded individually. An individual segment can be loaded to enable access to memory addresses corresponding to the loaded segment prior to loading of the remaining segments. This enables certain memory accesses initially received (e.g. at power up time) to be processed while the remaining segments are loaded.

In a typical solid-state storage device, commands received from a host designate a logical memory address. The logical memory address is then converted into a physical address corresponding to a storage location on the non-volatile media. Typically this logical-to-physical address mapping is maintained in a mapping table in volatile memory of the controller of the storage device. As changes are made to the mapping table, the controller periodically saves a copy of the mapping table to the non-volatile storage array. Because the mapping table can comprise a significant amount of data (e.g. 256 Mb for a 256 Gb drive), changes to the mapping table made between saves to the non-volatile storage array can be recorded in a log of mapping table changes and the log can also be saved to non-volatile memory. In this way, the storage device is able to reload the mapping table to volatile memory from the non-volatile memory and reconstruct any changes to the mapping table by using the log data. On system power up, mapping data must be loaded prior to servicing any media access requests to ensure the logical addresses resolve to the proper locations on the storage array.

Figure 1:
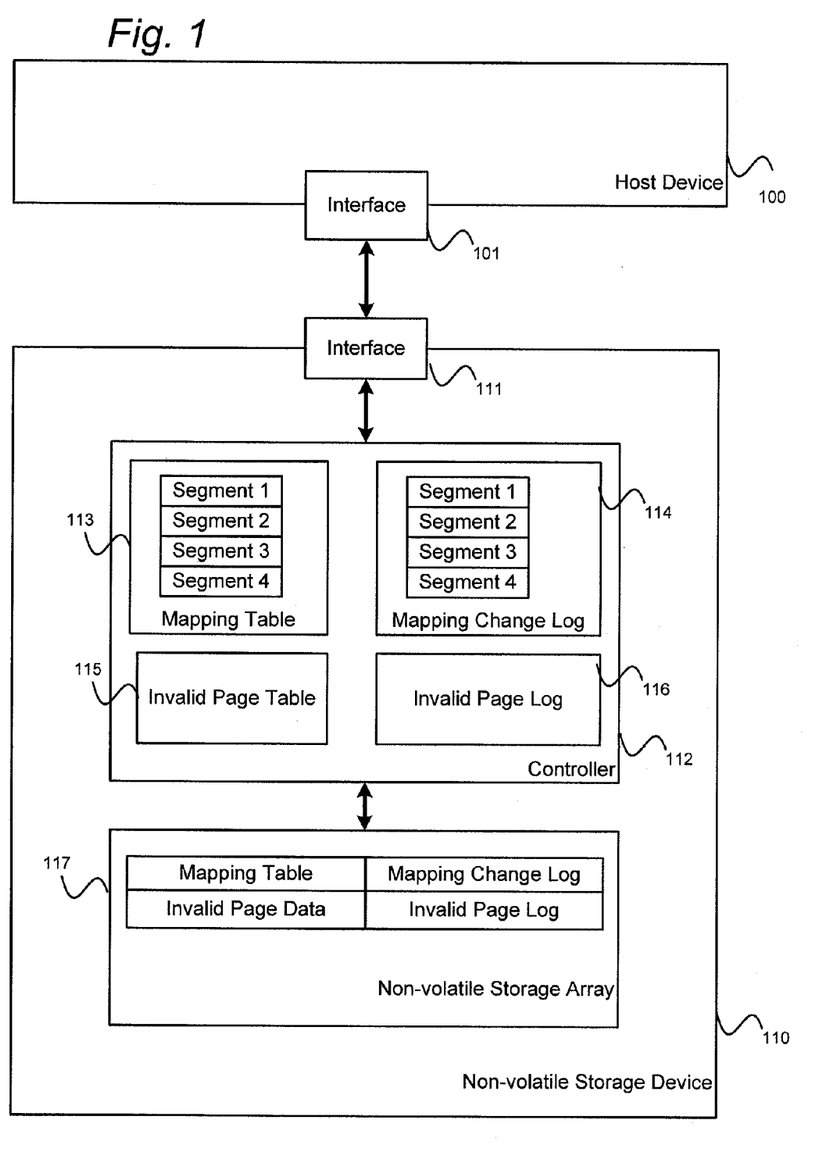
FIG. 1 shows a non-volatile storage device in communication with a host device according to an embodiment.

Referring to FIG. 1, a non-volatile storage system is shown according to an embodiment of the invention. The non-volatile storage device 110 is in communication with a host device 100 through interfaces 101 and 111. The interfaces 101 and 111 provide a communications pathway between the host device and the non-volatile storage device, and can implement any method of communication as known in the art, such as SATA, SAS, USB, Firewire and other communication methods. A controller 112 is typically responsible for receiving and processing commands from the host as well as internal commands. Functions of the controller 112 can be implemented in hardware and/or software on a processor and can be located in one or a plurality of physical components according to the designer's preference. In one embodiment, the controller 112 includes a volatile memory unit such as DRAM that stores a mapping table 113, a mapping table change log 114, an invalid page table 115, and an invalid page log 116. The mapping table 113 can be separated into a plurality of segments. Each segment corresponds to a portion of the logical addresses used in the mapping table. The mapping table change log 114 can record changes to the mapping table and separately record changes to each segment. In one embodiment, the invalid page table 115 indicates whether pages are valid or invalid, and can be used to determine whether pages are available for data operations or in a condition for garbage collection.

The controller's record of the mapping table, invalid page table and their associated change logs is typically retained in volatile memory or otherwise lost when power is lost on the non-volatile storage device. As such, the controller saves (or "flushes") this information to the non-volatile storage array 117 as shown. Though not shown in this figure, the mapping table and mapping change log in one embodiment are also stored as segments on the non-volatile storage array 117. The segments stored on the non-volatile storage array 117 may be stored together or in different portions of the non-volatile storage array 117.

Unified Mapping Table

Figure 2:
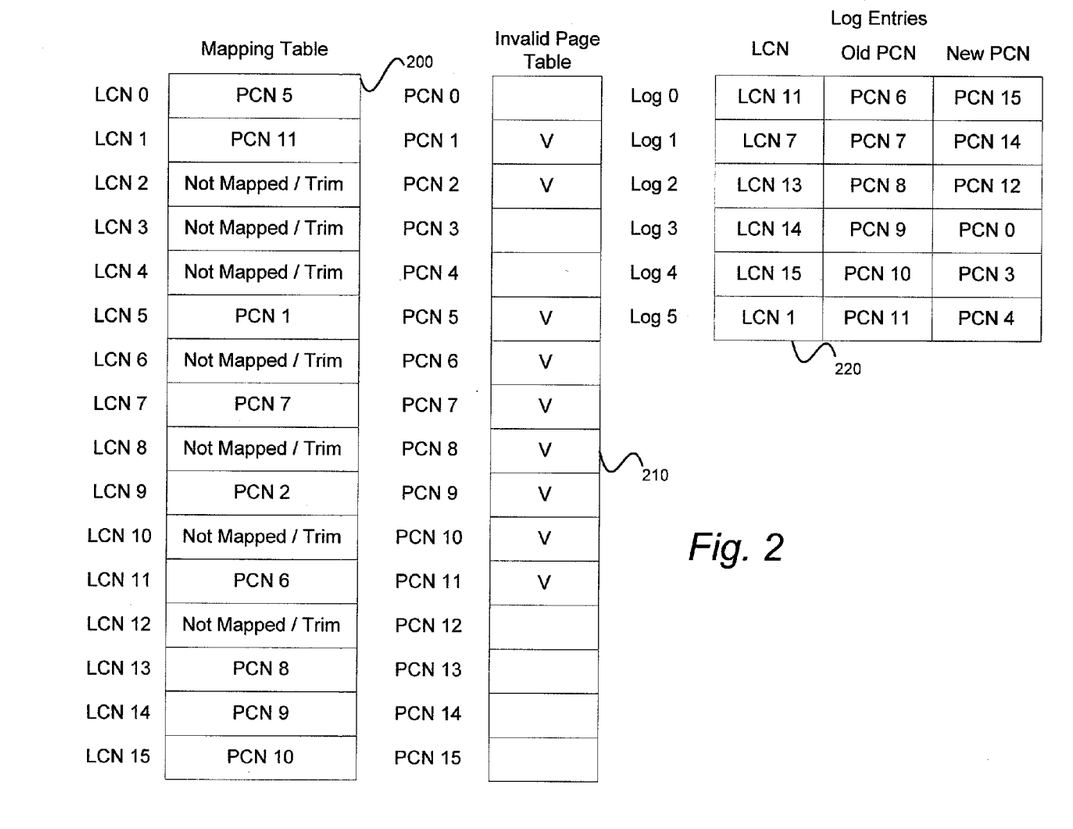
FIG. 2 shows a mapping table, an invalid page table, and log entries for a non-volatile storage device.

Referring now to FIG. 2, a mapping table 200 is shown without any segments. In one embodiment, the mapping table 200 provides logical-to-physical address mapping for the logical address range of the non-volatile storage system. As shown, the mapping table 200 indicates, for each logical chunk number (LCN), either a corresponding physical chunk number (PCN) or that the LCN is not mapped or has been designated "trim" by a host device trim command. The invalid page table 210 indicates whether each PCN contains valid data. In one embodiment, a data validity indicator such as a validity data bit can indicate whether the data is eligible for garbage collection. The log data 220 records changes to the mapping and invalid page tables during drive operation. The log data can be saved to the non-volatile memory and used to reconstruct the mapping table and invalid page table. In the embodiment shown in FIG. 2, the log data includes an indication of the LCN, the old PCN and the new PCN corresponding to the LCN. As discussed above, upon mapping table reconstruction (e.g. at power-up), the controller would load the mapping table 200 and the invalid page table 210 from non-volatile memory into volatile memory and process the log entries to update the two tables. For example, log entry 0 indicates that LCN 11 should now correspond to PCN 15 instead of PCN 6. Thus, LCN 11 in the mapping table 200, which currently shows PCN 6, would be changed to PCN 15 in the update process. In addition, PCN 6, which is marked "valid" in the invalid page table 210, would be changed to "invalid" and PCN 15 would be changed to "valid." Without segmentation, the controller would need to load the entire mapping table and process all the related log entries upon power-up to update the mapping table before any data access requests can be serviced.

Segmented Mapping Table

Figure 3:
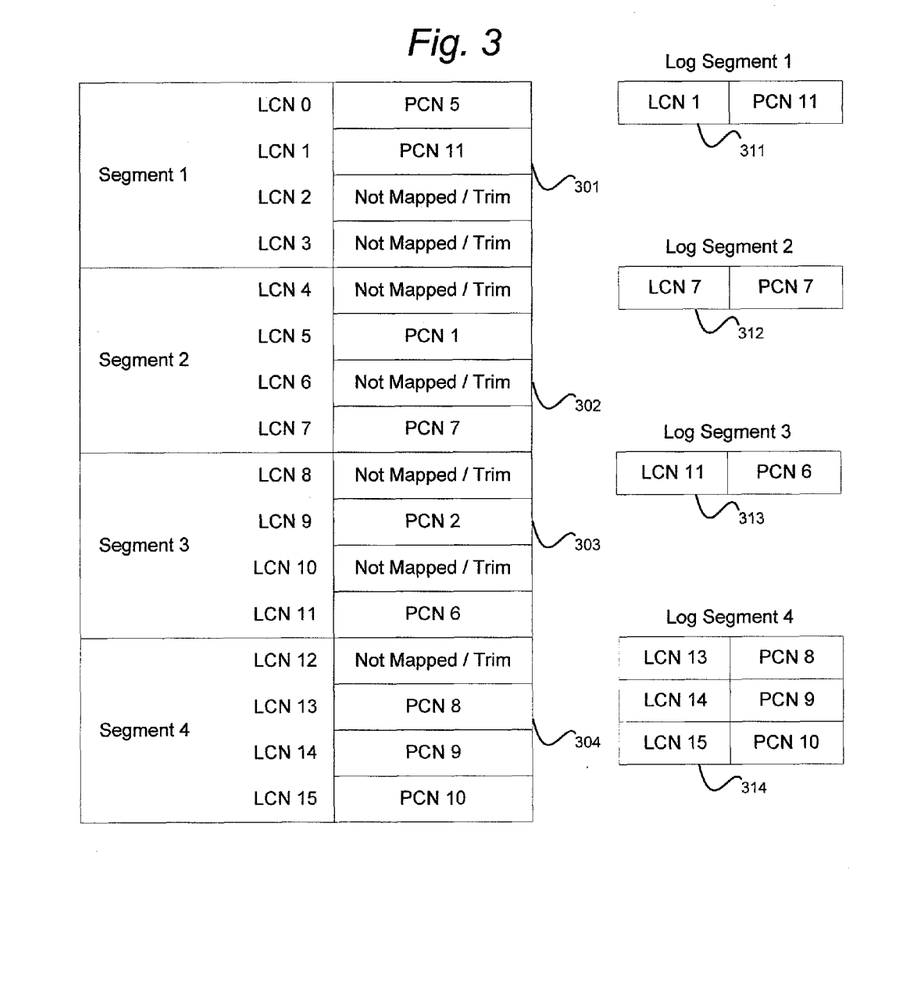
FIG. 3 shows a segmented mapping table and logs according to an embodiment.

Referring to FIG. 3, a segmented mapping table and logs according to an embodiment are shown. Each mapping table segment includes a portion of the whole mapping table. In this example, mapping table segment 301 includes LCN 0 through 3, mapping table segment 302 includes LCN 4 through 7 and mapping table segments 303 and 304 include LCN 8-11 and 12-15, respectively. As shown in this example, each segment comprises four LCNs. In practice, a segment may correspond to 32 or 64 Gb of logical addresses. Certain embodiments may use two, four, eight, or any number of segments.

Figure 4:
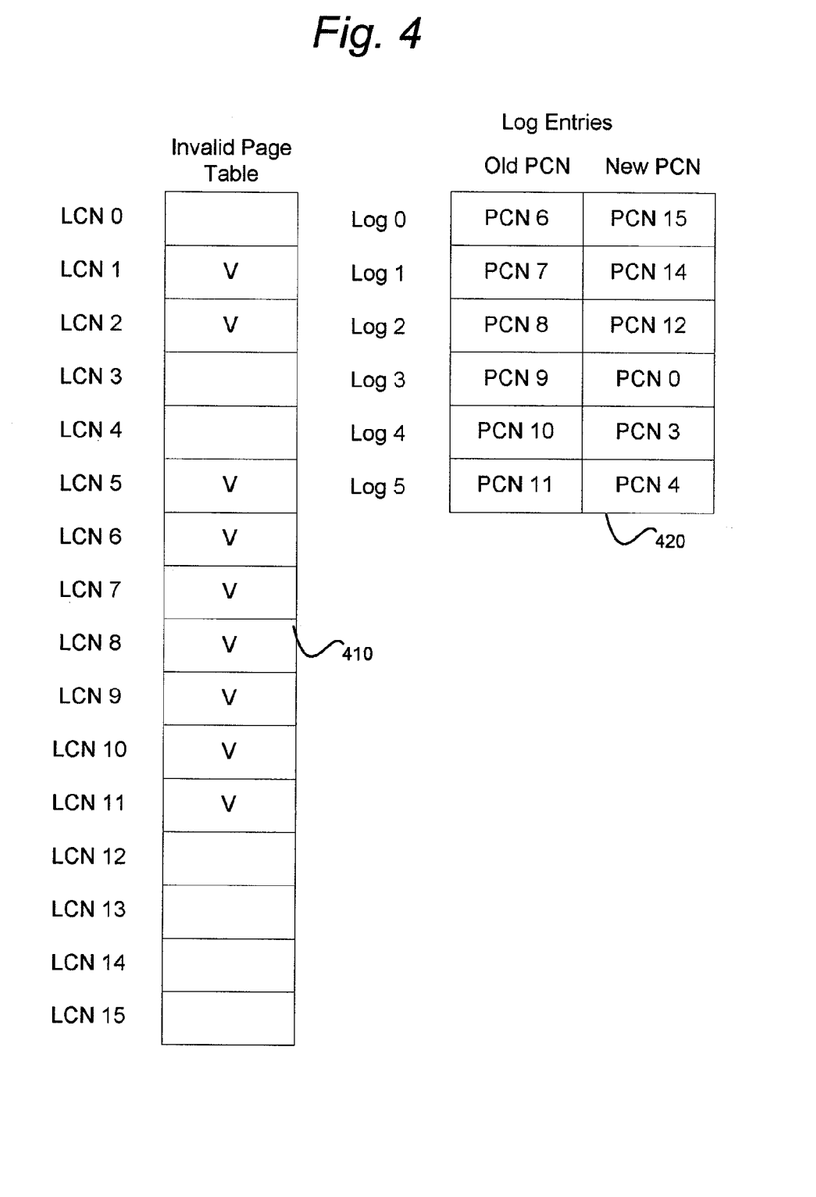
FIG. 4 shows an invalid page table and an invalid page table log according to an embodiment.

In one embodiment, the logs can also be segmented to correspond to the mapping table segments. Log segment 311 includes a log of changes to the LCNs associated with mapping table segment 301. Likewise, each of log segments 312, 313, and 314 includes a log of changes to each associated mapping table segment. The log segments shown include the LCN and the new PCN for the LCN. Because these logs are selected only to update the mapping tables, it is only necessary to record the new LCN. In one embodiment, a separate log noting new and old PCNs may be retained for the invalid page table as shown in FIG. 4. These logs may record only changes made since the last time the mapping table was written to the non-volatile storage array, or may maintain logs older than the last time the mapping table was written to non-volatile storage.

As a result of this segmentation, when the mapping table must be loaded from non-volatile memory (e.g. on power-up), the correct mapping for a particular LCN can be determined by loading the segment corresponding to that LCN and updating the segment with the log corresponding to that segment. In this way, it is not necessary to load all segments to correctly resolve a translation from a LCN to a PCN, a requisite for processing memory access requests.

As shown by this example, the logs may receive new entries unevenly. In this example, log segment 314 has more entries compared to the other log segments. As a result, loading and updating segments 301, 302, and 303 may be faster than loading and updating segment 304. In a non-segmented system where the entire mapping table is loaded and then updated with a single change log, the log entries that are relevant only to LCNs 12 through 15 may delay the readiness of the controller to process address translation for requests directed to LCNs 0 through 11. By contrast, in the segmented system as shown, a data access request directed to LCN 7, for example, can be processed by simply loading mapping segment 302 and updating it with log segment 312. As a result, the controller is able to service such a request much faster.

Referring now to FIG. 4, an invalid page table is shown according to an embodiment. Though the mapping table can be segmented as shown in FIG. 3, the invalid page table typically must be fully loaded before processing memory access requests. Because the invalid page table 410 can now be loaded separately from the mapping table segments, the invalid page table log 420 needs only retain the old and new PCNs. As the invalid page table 410 is loaded, the controller can traverse the invalid page log 420 to update the invalid page table 410 by invalidating old PCNs and validating new PCNs.

Loading a Segmented Mapping Table

Figure 5:
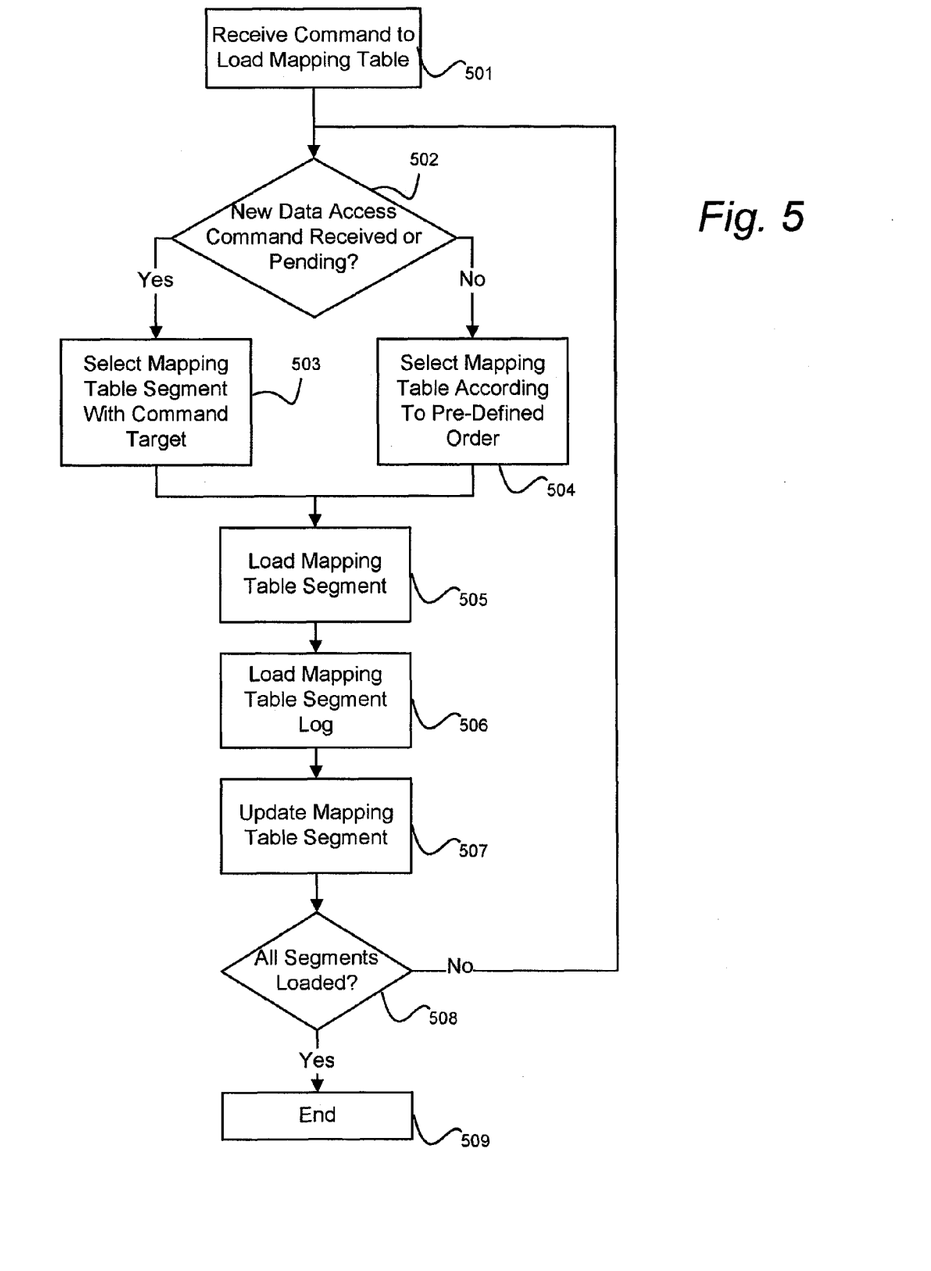
FIG. 5 shows a flowchart for loading mapping table data according to an embodiment.

Referring to FIG. 5, a flowchart depicting a process for loading the mapping table is shown according to an embodiment. This process may be performed, for example, by a controller of the non-volatile storage system (e.g. the controller 112). Typically, prior to execution of this process, the invalid page table has been loaded and the validity of pages on the non-volatile storage array has been designated. At block 501, a command to load the mapping table from non-volatile memory to volatile memory is received. This command may be requested on power up for processing initial memory access requests, or may be requested any time the mapping table in volatile memory may have become corrupted. First, a determination is made of which mapping table segment to load at blocks 502, 503, and 504. At block 502, the controller determines whether there is a pending command seeking a memory access. To correctly translate the logical address of the memory access, a pending memory access command must wait on the mapping table segment corresponding to that logical address to load and update before that access command can complete. As a result, if there is a pending command at block 502, the mapping table segment corresponding to that segment is selected to load at block 503 to expedite servicing of that memory access command. Using the example in FIG. 3, if a command to write LCN 7 is pending, mapping table segment 302 would be selected for loading. In certain embodiments, pending memory access commands may not have this priority depending on other conditions of the storage system.

If there is no pending command (or if the storage system is not giving priority to a pending command), a pre-defined order for loading mapping segments may be followed at block 504. This pre-defined order can follow a variety of algorithms for determining a load order according to various embodiments. Typically, the algorithm will seek to anticipate an upcoming memory access request, such that the upcoming memory access command can be serviced while the remainder of the mapping table segments are loaded. For example, on power up, an operating system may typically seek accesses from low LCN ranges which correspond to the operating system's initialization data. In that case, an order may load the mapping table segments beginning with the lowest LCN ranges. An alternative order may be determined by maintaining a record of initial memory accesses (e.g. those received right after power-up) and ordering segment loading according to the most frequent or most recent initial memory access location(s).

Once a segment is chosen by blocks 503 and 504, at block 505 the segment is loaded from non-volatile memory. At block 506, the corresponding mapping table segment log is loaded from non-volatile memory. At block 507, the mapping table segment is updated with the log information. After the mapping table segment is updated at block 507, the logical address range referenced by that mapping table segment is ready for memory access translation. At block 508, the process determines whether there are remaining segments to load, and if so, returns to block 502 to determine the next segment to load. If all segments have been loaded, the process completes at block 509.

A segmented mapping table can also provide run-time advantages. In order to maintain power-up metrics (e.g. completing the power-up process under a certain time limitation), a controller will typically maintain a limited log depth prior to flushing a mapping table to non-volatile memory. By segmenting the mapping table, each mapping table segment can maintain a log depth, which collectively may be higher than the log depth used in the non-segmented case but maintain metrics performance equal to or greater than compared to the no-segmentation case. For example, a non-segmented table may have a log-depth of 100 entries and the same table divided into four segments may have four corresponding logs of 30 entries each. As a result, the segmented mapping table can reduce the flushing rate during its normal operations since flushing must occur when log capacity is reached. Described another way, using a segmented mapping table can enable the controller to process more commands without the delays associated with flushing a mapping table as frequently. In addition, when flushing, the controller can flush individual segments at once, which places a smaller overhead load to write to non-volatile storage as compared to flushing an entire mapping table.

Though described in this application with reference to a solid-state storage system, the systems, methods, and techniques described in this application are broadly applicable to other situations which make use of a logical to physical address mapping (or address indirection). For example, certain implementations of hard disk drives may also use address indirection with a logical-to-physical mapping to facilitate shingled writes on a disk.

In addition, it is not necessary that the mapping data and invalid page data be stored on the non-volatile storage array to which it refers. For example, a first non-volatile storage array may maintain mapping table and invalid page data corresponding to a second non-volatile storage media. This may be useful, for example, if a solid-state array stores mapping information for a shingled hard disk implementing address indirection. In this way, the mapping information for the shingled hard disk could quickly be loaded from the solid-state storage and enable faster access to the shingled hard disk than reading mapping information from the shingled hard disk directly.

While this disclosure has described a mapping table with four segments of equal size, a mapping table may have any number of segments each with an individual size. For example, an implementation for a mapping table with 128 LCNs may comprise three mapping table segments, one segment corresponding to 64 LCNs and two segments each corresponding to 32 LCNs. It may be advantageous to locate the LCNs most frequently used as the initial accesses on a short segment to facilitate quick loading and initial use. In another embodiment, the number of logs may be greater than or less than the number of segments. For example, in one embodiment a log segment may correspond to two or more mapping table segments.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual steps taken in the processes shown in FIG. 5 may differ from those shown in the figures. Depending on the embodiment, certain of the steps described in the example above may be removed, others may be added, and the sequence of steps may be altered and/or performed in parallel. Those skilled in the art will recognize that variations can be made to the scope and organization of the information stored in the mapping table and invalid page table discussed in FIGS. 2, 3, and 4 without departing from the scope of the invention. Although this disclosure describes examples in which data is stored in pages or logical address chunks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile storage system capable of reducing delay associated with loading logical-to-physical address mapping data, comprising:

a non-volatile memory array associated with a plurality of physical addresses, the non-volatile memory array storing:

a mapping table comprising a plurality of mapping entries providing logical-to-physical address mappings for the non-volatile memory array, individual mapping entries of the plurality of mapping entries providing a one-to-one logical-to-physical address mapping for a respective portion of the non-volatile memory array, the plurality of mapping entries arranged into a plurality of mapping segments, at least one mapping segment of the plurality of mapping segments comprising more than one mapping entry of the plurality of mapping entries; and a controller configured to:
in response to determining that a memory access command designating a logical address mapped in the mapping table is being executed during a current power-up process of the non-volatile storage system:
load a first mapping segment of the plurality of mapping segments from the non-volatile memory array to the volatile memory, the logical address designated by the memory access command mapped in the first mapping segment,
update the first mapping segment by associating the logical address designated by the memory access command with an updated physical address of the plurality of physical addresses stored in a first log, and
while loading a second mapping segment of the plurality of mapping segments from the non-volatile memory array to the volatile memory, process a logical-to-physical address conversion for the memory access command using the updated first mapping segment, the processing of the logical-to-physical address conversion for the memory access command not being contingent on updating the second mapping segment by associating at least one logical address mapped in the second mapping segment with at least one updated physical address of the plurality of physical addresses stored in a second log,
wherein the updated physical address stored in the first log references a first physical location of the non-volatile memory array that stores first updated data written after second updated data had already been stored in a second physical location of the non-volatile memory array referenced by the at least one updated physical address stored in the second log; and
in response to determining that no memory access commands designating the logical addresses mapped in the mapping table are being executed during the current power-up process of the non-volatile storage system:
select at least one mapping segment of the plurality of mapping segments based at least on a history of logical addresses accessed after a previous power-up process of the non-volatile storage system, the selected at least one mapping segment including logical-to-physical address mappings associating logical addresses accessed after the previous power-up process with corresponding physical addresses of the plurality of physical addresses, and
load the selected at least one mapping segment from the non-volatile memory array to a volatile memory before loading one or more other mapping segments of the plurality of mapping segments, whereby the loading of the selected at least one mapping segment enables accessing of data stored to a first physical address of the plurality of physical addresses mapped in the selected at least one mapping segment before accessing of data stored to one or more other physical addresses of the plurality of physical addresses mapped in the one or more other mapping segments of the plurality of mapping segments.

2. The non-volatile storage system of claim 1, wherein each mapping segment of the plurality of mapping segments provides a logical-to-physical address mapping for a non-overlapping portion of the non-volatile memory.

3. The non-volatile storage system of claim 1, wherein the physical addresses mapped in the selected at least one mapping segment store host system data.

4. The non-volatile storage system of claim 1, wherein the controller is configured to select the at least one mapping segment based at least on a frequency at which the logical addresses are accessed after the previous power-up process.

5. The non-volatile storage system of claim 1, wherein the controller is configured to select the at least one mapping segment including one or more logical addresses accessed most frequently after the previous power-up process.

6. The non-volatile storage system of claim 1, wherein the controller is configured to select the at least one mapping segment based at least on a recency that the logical addresses are accessed after the previous power-up process.

7. The non-volatile storage system of claim 1, wherein the controller is configured to select the at least one mapping segment based at least on the history of logical addresses accessed after the previous power-up process in response to one or more memory access commands received from a host system.

8. The non-volatile storage system of claim 1, wherein the controller is configured to select the at least one mapping segment based at least on the history of logical addresses accessed immediately after the previous power-up process.

9. The non-volatile storage system of claim 1, wherein the history of logical addresses accessed after the previous power-up process comprises a record of initial memory accesses after the previous power-up process.

10. The non-volatile storage system of claim 1, wherein the memory access command is received from a host system.

11. A method of reducing delay associated with loading logical-to-physical address mapping data performed by a controller in a non-volatile storage system, the method comprising:
storing a mapping table comprising a plurality of mapping entries providing logical-to-physical address mappings for a non-volatile memory array, individual mapping entries of the plurality of mapping entries providing a one-to-one logical-to-physical address mapping for a respective portion of the non-volatile memory array, the plurality of mapping entries arranged into a plurality of mapping segments, at least one mapping segment of the plurality of mapping segments comprising more than one mapping entry of the plurality of mapping entries;
in response to determining that a memory access command designating a logical address mapped in the mapping table is being executed during a current power-up process of the non-volatile storage system:
loading a first mapping segment of the plurality of mapping segments from the non-volatile memory array to the volatile memory, the logical address designated by the memory access command mapped in the first mapping segment,
updating the first mapping segment by associating the logical address designated by the memory access command with an updated physical address of the plurality of physical addresses stored in a first log, and
while loading a second mapping segment of the plurality of mapping segments from the non-volatile memory array to the volatile memory, processing a logical-to-physical address conversion for the memory access command using the updated first mapping segment, the processing of the logical-to-physical address conversion for the memory access command not being contingent on updating the second mapping segment by associating at least one logical address mapped in the second mapping segment with at least one updated physical address of the plurality of physical addresses stored in a second log, wherein the updated physical address stored in the first log references a first physical location of the non-volatile memory array that stores first updated data written after second updated data had already been stored in a second physical location of the non-volatile memory array referenced by the at least one updated physical address stored in the second log; and in response to determining that no memory access commands designating the logical addresses mapped in the mapping table are being executed during the current power-up process of the non-volatile storage system:

selecting at least one mapping segment of the plurality of mapping segments based at least on a history of logical addresses accessed after a previous power-up process of the non-volatile storage system, the selected at least one mapping segment including logical-to-physical address mappings associating logical addresses accessed after the previous power-up process with corresponding physical addresses of the plurality of physical addresses, and loading the selected at least one mapping segment from the non-volatile memory array to a volatile memory before loading one or more other mapping segments of the plurality of mapping segments, whereby the loading of the selected at least one mapping segment enables accessing of data stored to a first physical address of the plurality of physical addresses mapped in the selected at least one mapping segment before accessing of data stored to one or more other physical addresses of the plurality of physical addresses mapped in the one or more other mapping segments of the plurality of mapping segments.

12. The method of claim 11, wherein each mapping segment of the plurality of mapping segments provides a logical-to-physical address mapping for a non-overlapping portion of the non-volatile memory.

13. The method of claim 11, wherein the physical addresses mapped in the selected at least one mapping segment store host system data.

14. The method of claim 11, further comprising selecting the at least one mapping segment based at least on a frequency at which the logical addresses are accessed after the previous power-up process.

15. The method of claim 11, further comprising selecting the at least one mapping segment including one or more logical addresses accessed most frequently after the previous power-up process.

16. The method of claim 11, further comprising selecting the at least one mapping segment based at least on a recency that the logical addresses are accessed after the previous power-up process.

17. The method of claim 11, further comprising selecting the at least one mapping segment based at least on the history of logical addresses accessed after the previous power-up process in response to one or more memory access commands received from a host system.

18. The method of claim 11, further comprising selecting the at least one mapping segment based at least on the history of logical addresses accessed immediately after the previous power-up process.

19. The method of claim 11, wherein the history of logical addresses accessed after the previous power-up process comprises a record of initial memory accesses after the previous power-up process.

20. The method of claim 11, further comprising receiving the memory access command from a host system.

* * * * *